United States Patent [19]

Davis et al.

[11] Patent Number: 6,096,422
[45] Date of Patent: Aug. 1, 2000

[54] POLY(DIMETHYLSILOXANE)-BASED INTERMEDIATE LAYER FOR FUSER MEMBERS

[75] Inventors: Stephen V. Davis, Rochester; Jiann-Hsing Chen, Fairport; Nataly Boulatnikov, Ontario, all of N.Y.

[73] Assignee: Eastman Kodak Company, Rochester, N.Y.

[21] Appl. No.: 09/224,387

[22] Filed: Dec. 31, 1998

[51] Int. Cl.⁷ ...................................................... D02G 3/00
[52] U.S. Cl. .......................... 428/375; 428/447; 428/448; 428/906; 428/450
[58] Field of Search ...................................... 428/375, 447, 428/448, 906, 450

[56] References Cited

U.S. PATENT DOCUMENTS

| 5,534,347 | 7/1996 | Chen et al. | 428/375 |
| 5,960,245 | 9/1999 | Chen et al. | 399/333 |

*Primary Examiner*—William Krynski
*Assistant Examiner*—B. Shewareged
*Attorney, Agent, or Firm*—Doreen M. Wells

[57] ABSTRACT

A fuser member having a support metallic core and a layer of material formed over the metallic core, an intermediate layer, and an outermost layer, the intermediate layer including a cross-linked poly(dialkylsiloxane) incorporating an oxide; one or more multifunctional silanes; one or more amino functional silane crosslinking agents; catalyst; and optional fillers.

12 Claims, No Drawings

POLY(DIMETHYLSILOXANE)-BASED INTERMEDIATE LAYER FOR FUSER MEMBERS

FIELD OF THE INVENTION

The present invention relates generally to the field of fuser members useful in electrophotographic copying and in particular to an intermediate layer for a fusing member which provides high image quality and processability.

BACKGROUND OF THE INVENTION

A widely used method for affixing toner materials to a receiver sheet is by the application of high temperature and pressure in the fusing subsystem of a photocopying machine. A common configuration for a fusing subsystem is to place a pair of cylindrical rollers in contact. The roller that contacts the side of the receiver sheet carrying the unfixed or unfused toner is known as the fuser roller. The other roller is known as the pressure roller. The area of contact is known as the nip.

A toner receiver sheet containing the unfixed or unfused toner is passed through the nip. A soft coating on one or both of the rollers allows the nip to increase in size relative to the nip which would have been formed between two hard rollers and allows the nip to conform to the receiver sheet, improving the fusing quality. Typically, one or both of the rollers are heated, either through application of heat from the interior of the roller or through external heating. A load is applied to one or both rollers in order to generate the higher pressures that are necessary for good fixing or fusing of the toner to the receiver sheet.

The application of high temperature and pressure as the receiver sheet passes through the nip causes the toner material to flow to some degree, increasing its contact area with the receiver sheet. If the cohesive strength of the toner and the adhesion of the toner to the receiver sheet is greater than the adhesion strength of the toner to the fuser roller, complete fusing occurs. However, in certain cases, the cohesive strength of the toner or the adhesion strength of the toner to the receiver is less than that of the toner to the fuser roller. When this occurs, some toner will remain on the roller surface after the receiver sheet has passed through the nip, giving rise to a phenomenon known as contamination. Contamination can also occur on the pressure roller.

In order to achieve desired image quality with respect to gloss, the surface properties of the roller are paramount. This is also true of an overcoated roller. The base cushion surface properties can affect the final, outer surface properties of the fuser member and therefore affect image quality.

There are two possible methods of making suitable fuser members. The first is to mold the fuser member or the fuser member base cushion. The advantage of this is that the surface properties of the fuser member or base cushion can be controlled by the quality of the mold surface. The disadvantage of this process is that a molded part will generally have problems associated with resin shrinkage and centering of the roller in the mold. The problems occur when the material is not perfectly centered on the roller. This results in paper handling problems as well as the possibility of an uneven nip. An uneven nip results in nonuniform fusing quality and gloss.

Multilayer rollers have been described to impart properties such as an oil barrier layer as described in U.S. patent application Ser. No. 09/056,027 and adhesion as in U.S. Pat. No. 5,534,347. Another role for an intermediate layer may be to separate two incompatible materials such as an addition cured from a condensation cured silicone as in U.S. patent application Ser. No. 09/056,027.

The second method for making a suitable fuser member is to coat an intermediate layer over a ground roller surface. This allows the tight control of the dimensional tolerance. In order to be able to produce a fuser member for a high quality image with desirable image characteristics such as gloss. One criterion is that the intermediate layer must be able to fill in all the pores of the ground surface. Another criterion is that the process should proceed quickly.

One difficulty in obtaining consistent high image quality with ground fuser roller material is that any roughness or variability in the grinding method and wheel, or the occurrence of a high frequency pattern from grinding, becomes apparent in the final image and this is undesirable. Intermediate layers have been mentioned as a method to control surface finish but they have not been described in detail.

There is a need for improved fuser members with improved fusing performance, e.g. increased coating quality to produce improved image characteristics without reducing the toner releasability, fuser member processability, temperature control, or dimensional tolerances.

SUMMARY OF THE INVENTION

It is an object of the present invention to provide a fuser member intermediate layer to improve image quality.

In accordance with the present invention there is provided a fuser member having a support metallic core and a layer of material formed over the metallic core which can be ground to yield tight mechanical tolerances; one or more intermediate layers; one such intermediate layer being made to affect surface properties; and an outer layer. The intermediate layer includes:

(a) a cross-linked poly(dialkylsiloxane) incorporating at least one oxide, wherein the poly(dialkylsiloxane) has a weight average molecular weight before crosslinking above 5,000;

(b) one or more multifunctional silanes;

(c) one or more amino functional silane crosslinking agents; and (d) catalyst.

An advantage of the present invention is that by interposing the intermediate layer of the invention between the support and the outermost layer, the surface properties, primarily roughness, of the outer layer of the fuser member can be improved.

Another advantage of the current invention is that the intermediate layer successfully improves the surface properties of the fuser member outer layer thus allowing the base cushion to be ground to mechanical tolerances without loss of image characteristics.

Another advantage of the present invention is that the surface properties of the fuser member outer layer are improved without significantly affecting processing time in that without the current invention a fuser member constructed with a similar intermediate layer would require significant drying time thus delaying production.

DETAILED DESCRIPTION OF THE INVENTION

The intermediate layer of the fuser member of the invention includes a cross-linked poly(dialkylsiloxane) having at least one oxide. The oxides present as fillers are an oxide or mixture of oxides. Typical oxides include metal oxides such as aluminum oxide, iron oxide, tin oxide, zinc oxide, copper oxide and nickel oxide. Silica (silicon oxide) can also be used.

Optionally other fillers may be added to yield other properties. One such filler is a silicone T-resin which can improve solution shelf life.

Silanol-terminated poly(dialkylsiloxane) polymers and methods of their preparation are well known. They are readily commercially available, e.g., from Huls America, Inc.,(United Chemical), and have the repeat unit structure:

Structure 1

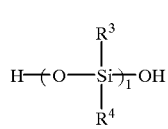

For purpose of the present invention 1 is an integer such that the Structure (I) polymer has a weight average molecular weight above 5,000 i.e., 1 is between 60 and 1,300 when $R^3$ and $R^4$ are both methyl. $R^3$ and $R^4$ are independently alkyl groups such as methyl, ethyl, propyl, butyl, pentyl, or hexyl. If the molecular weight were above 100,000, the final cross-linked poly(dialkylsiloxane) flow characteristics would hinder the intermediate layer from drying efficiently.

The poly(dialkylsiloxane) polymers can be cross-linked with multifunctional silanes. The multifunctional silanes that can serve as crosslinking agents for the Structure (I) polymers are well known for this purpose. Each of such silanes comprises a silicon atom bonded to at least three groups that are functional to condense with the hydroxy end groups of the Structure (I) polymers to thereby create siloxane crosslinks through the silicon atom of the silane. The functional groups of the silanes can be, for example, acyloxy (R—COO—), alkenoxy ($CH_2$=C(R)O—), alkoxy (R—O—), dialkylamino ($R_2$ N—), or alkyliminoxy ($R_2$ C=N—O—) groups, wherein R represents an alkyl moiety. Some specific examples of suitable multifunctional silane crosslinking agents are methyltrimethoxysilane, tetraethoxysilane, methyltripropenoxysilane, methyltriacetoxysilane, propyltrimethoxysilane, methyltris(butanone oxime)silane, and methyltris(diethylamino)silane. A preferred silane crosslinking agent is polyethylsilicate (condensed tetraethylorthosilicate).

In the case where alkoxy functional groups are employed, the condensation crosslinking reaction is carried out with the aid of a catalyst, such as, for example, a titanate, chloride, oxide, or carboxylic acid salt of zinc, tin, iron, or lead. Some specific examples of suitable catalysts are zinc octoate, dibutyltin diacetate, ferric chloride, and lead dioxide.

The primary cross-linked poly(dialkylsiloxane) material used for the Examples and Comparative Examples is Stycast® 4952, sold by Grace Specialty Polymers, Massachusetts. Stycast® 4952 is composed of a network-forming polymer that is a silanol-terminated (α-ω-hydroxy-) poly(dimethylsiloxane). The number of repeat units is such that the silanol-terminated poly(dimethylsiloxane) (α-ω-dihydroxy)poly(dimethylsiloxane) has a weight average molecular weight of from 5,000 to 80,000. This composition includes the filler. The filler is between 55–70 wt % aluminum oxide and 5–15 wt % iron oxide particulate fillers. Polyethylsilicate is present as the crosslinking agent. All weight percentages herein refer to weight precentage based on the entire weight of the mixture.

Specific examples of useful catalysts for this polymer are dibutyltin diacetate, tin octoate, zinc octoate, dibutyltin dichloride, dibutyltin dibutoxide, ferric chloride, lead dioxide, or mixtures of catalysts such as CAT50® (sold by Grace Specialty Polymers, Massachusetts). CAT50® is believed to be a mixture of dibutyltin dibutoxide and dibutyltin dichloride diluted with butanol. In addition to the multifunctional silane described above one or more aminofunctional silanes are also added. Each of such aminofunctional silanes comprises a silicon atom bonded to at least one group that is functional to condense with the hydroxy end groups of the Structure (I) polymers to thereby create chemical bonds through the silicon atom of the silane. Also the silicon atom is bonded to at least one group that contains a primary amino, $NH_2$, or secondary, NH-group. The role of the aminofunctional silane is to promote rapid drying of the intermediate layer. The aminofunctional silanes useful is represented by the following structure

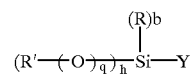

Where R can be an alkyl group having 1 to 7 carbon aroms, R' can be an alkyl group having 1 to 7 carbon atoms or a polyalkoxyalkyl group of less than 7 carbon atoms; Y is an amino group or an amino substituted alkyl, or a poylaminosunstituted alkyl or an alkenylalkoxy amino or an aryl amino group of less than 15 carbon atoms and h is 1 to 3, b is 0 to 2, q is 1 or 2 and h+b=3. Specific example of such aminofunctional silanes 3-aminopropyltrimethoxy silane, 3-aminopropyldiethoxymethoxysilane, 3-aminopropyl triethoxysilane, 3-aminopropylethoxydimethoxysilane, and m,p-(aminoethylaminomethyl)phenyltrimethoxysilane.

The aminofunctional silane is present in an amount of 0.3 to 15 parts based on 100 parts of poly(dialkylsiloxane).

For one preferred embodiment, the various components of the intermediate layer material can have the following weight percentages:

(a) 10–60 wt % (α-ω-hydroxy-poly(dialkyl siloxane) having a weight average molecular weight above 5,000;

(b) 55–85 wt % oxide fillers, especially the combination of 55–70 wt % aluminum oxide and 5–15 wt % iron oxide;

(c) 0.5–5 wt % crosslinking agent;

(d) 0.3 to 15 parts aminofunctional silane cross linking agent based on 100 parts of poly(dialkylsiloxane); and (e) 0.01–2 wt % catalyst.

The catalyst concentration is chosen to yield a tough material with reasonable processing time. In the event of choosing a lower reactivity catalyst, then more than 2 weight percent catalyst can be useful.

To form the intermediate layer of a fuser member in accordance with the invention, a slight excess of the stoichiometric amount of multifunctional silane to form crosslinks with all the hydroxy end groups, and the appropriate amount of filler are thoroughly mixed on a three-roll mill. The mix is then dissolved in a suitable solvent such as methylethylketone (MEK). The aminofunctional silane and the catalyst are then added to the solution with thorough stirring. The material can then be ring coated or preferably, due to the rapid drying of this material through the incorporation of the aminofunctional silane, the material can be transfer coated.

The intermediate layer described in the present invention can be used in conjuction with an oil barrier layer in the event of the outer layer being swellable by the release fluid.

An oil-barrier layer can be obtained by coating an underlying silicone elastomer, coated directly or indirectly on a cylindrical core, with a composition formed by compounding a mixture including a fluorocarbon copolymer, a fluorocarbon-curing agent, a curable polyfunctional poly($C_{(1-6)}$alkyl)phenylsiloxane polymer, one or more fillers and an accelerator for promoting crosslinking between the curing agent and the fluorocarbon copolymer as described in commonly assigned U.S. Pat. No. 5,534,347. Other candidates for oil barrier layer include most heat stable materials having no poly(dimethylsiloxane) oil swell.

The rollers produced in accordance with the present invention are thus useful in electrophotographic copying machines to fuse heat-softenable toner to a substrate. This can be accomplished by contacting a receiver, such as a sheet of paper, to which toner particles are electrostatically attracted in an imagewise fashion with such a fusing member. Such contact is maintained at a temperature and pressure sufficient to fuse the toner to the receiver.

EXAMPLES

The following examples are presented for a further understanding of the invention.

Example 1

A solution was prepared of the following: 62.5 percent solids of 100 parts Stycast® 4952; 2.8 parts 3-aminopropyltrimethoxysilane obtained from Aldrich Chemical Company; 20 parts TosPearl™ 145 obtained from GE Silicones; 0.25 parts CAT50® in methylethylketone. This solution was then coated on 2 mil Kapton®. The time for the overcoated layer to dry tack-free was then measured. The solution was checked periodically to determine its useful shelf life.

Example 2

A solution was prepared of the following: 62.5 percent solids of 100 parts Stycast® 4952; 2.8 parts 3-aminopropyltrimethoxysilane; 20 parts TosPearl™ 145; 0.25 parts CAT50® in methylethylketone. This solution was then coated on 2 mil Kapton®. The time for the overcoated layer to dry tack-free was then measured. The solution was checked periodically to determine its useful shelf life.

Example 3

A solution was prepared of the following: 62.5 percent solids of 100 parts Stycast® 4952; 2 parts m,p-(aminoethylaminomethyl) phenyltrimethoxysilane obtained from Aldrich Chemical Company; 20 parts TosPearl™; 0.25 parts CAT50® in methylethylketone. This solution was then coated on 2 mil Kapton®. The time for the overcoated layer to dry tack-free was then measured. The solution was checked periodically to determine its useful shelf life.

Comparative Example 1

A fuser roller was prepared by blade coating Stycast® 4952 on an aluminum core. The roller was air cured 4 hours at 25° C. The roller was then cured with a 12 hour ramp to 200° C. followed by an 18 hour hold at 200° C. The roller was then tested for roughness.

Comparative Example 2

A fuser roller was prepared by injection molding Stycast®4952 on an aluminum core. The roller was air cured 2 hours at 80° C. then demolded. The roller was then cured with a 12 hour ramp to 200° C. followed by an 18 hour hold at 200° C. The roller was then tested for roughness.

Comparative Example 3

A solution was prepared of the following: 62.5 percent solids of 100 parts Stycast® 4952; 0.25 parts CAT50® in methylethylketone. This solution was then coated on 2 mil Kapton®. The time for the overcoated layer to dry tack-free was then measured. The solution was checked periodically to determine its useful shelf life.

Material Testing

Drying time and Shelf Life

The drying time was measured by monitoring the coated Kapton® film until the coating was dry to the touch. Shelf life was determined by monitoring the solution until it gelled.

Roughness

The Roughness, Ra, and surface properties were measured on a Federal 4000 surfanalyzer with a chisel tip.

The results are shown in the following tables:

TABLE I

| Sample | Roughness |
| --- | --- |
| E1 | 35 |
| CE1 | 118 |
| CE2 | 18 |

TABLE 2

| Sample | Tack-free time (min) | solution shelf life (hours) |
| --- | --- | --- |
| E2 | 1 | 15 |
| E3 | 3 | 15 |
| CE3 | 960 | 24 |

Results

Looking first to Table 1, a molded base cushion has a dramatically lower roughness than the ground base cushion and the ground base cushion coated with the material of this invention (E1) has by far the lowest roughness.

Looking next to Table 2, the addition of the amino functional silane greatly decreases drying time without significantly affecting solution shelf life.

The examples and comparative examples demonstrate that incorporation of amino functional silane improved roughness of the fuser member without significantly affecting the processability.

The invention has been described with particular reference to preferred embodiments thereof but it will be understood that variations and modifications can be effected within the spirit and scope of the invention.

What is claimed is:

1. A fuser member having, in order, a support metallic core; a base layer; an intermediate layer, and an outermost layer, the intermediate layer comprising:
   (a) a cross-linked poly(dialkylsiloxane) incorporating an oxide;
   (b) one or more multifunctional silanes; and
   (c) one or more aminofunctional silane crosslinking agents in the amount of 0.3 to 15 parts per 100 parts of the cross-linked poly(dialkylsiloxane).

2. The fuser member of claim 1 wherein the cross-linked poly(dialkylsiloxane) includes poly(dimethylsiloxane).

3. The fuser member according to claim 1, wherein the cross-linked poly(dialkylsiloxane) is an (α-ω-hydroxy-) poly(dialkylsiloxane).

4. The fuser member according to claim 1, wherein the cross-linked poly(dialkylsiloxane) has a weight average molecular weight before crosslinking above 5,000.

5. The fuser member according to claim 1, wherein the cross-linked poly(dialkylsiloxane) has the general structure:

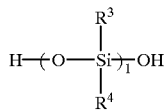

where l is an integer between 60 and 1,300 when $R^3$ and $R^4$ are both methyl;

$R^3$ and $R^4$ are independently alkyl groups selected from methyl, ethyl, propyl, butyl, pentyl, and hexyl.

6. The fuser member according to claim 1 wherein the multifunctional silanes comprise a polyethylsilicate crosslinking agent.

7. The fuser member according to claim 1 wherein the oxide includes aluminum oxide and iron oxide.

8. A fuser member having a support metallic core and a layer of material formed over the metallic core, an intermediate layer, and an outer layer, the intermediate layer including:

(a) a cross-linked poly(dialkylsiloxane) incorporating an oxide, wherein the poly(dialkylsiloxane) has a weight average molecular weight before crosslinking above 5,000;

(b) a silane crosslinking agent; and (c) one or more amino functional silane crosslinking agents being present in an amount less than 15 parts based on 100 parts of poly(dialkylsiloxane); the amino functional silane is represented by the following structure

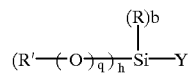

where R can be an alkyl group having 1 to 7 carbon atoms, R' can be an alkyl group having 1 to 7 carbon atoms or a polyalkoxyalkyl group of less than 7 carbon atoms; Y is an amino group or an amino substituted alkyl, or a poylaminosunstituted alkyl or an alkenylalkoxy amino or an aryl amino group of less than 15 carbon atoms and h is 1 to 3, b is 0 to 2, q is 1 or 2 and h+b=3.

9. The fuser member of claim 1 or 8 wherein the cross-linked poly(dialkylsiloxane) includes poly (dimethylsiloxane).

10. The fuser member of claim 1 or 8 wherein the oxide is present in an amount from 55% to 85% by weight of the total weight of the mixture.

11. The fuser member according to claim 8 wherein amino functional silane crosslinking agents are present in an amount of from about 0.3 to 15 parts per 100 parts of cross-linked poly(dialkylsiloxane).

12. The fuser member according to claim 1 or 8 wherein the fusing member is a fuser roller or a pressure roller.

* * * * *